United States Patent [19]

Sanborn, Jr.

[11] 4,240,241
[45] Dec. 23, 1980

[54] METHOD AND APPARATUS FOR MAKING A RECLOSABLE PACKAGE

[75] Inventor: Philip A. Sanborn, Jr., Spartanburg, S.C.

[73] Assignee: W. R. Grace & Co., Duncan, S.C.

[21] Appl. No.: 65,300

[22] Filed: Aug. 9, 1979

[51] Int. Cl.³ .................... B65B 61/18; B65B 31/02
[52] U.S. Cl. ........................... 53/412; 53/433;
    53/453; 53/511; 53/559; 53/133
[58] Field of Search ............... 53/410, 412, 433, 452,
    53/453, 128, 133, 511, 559; 93/35 R; 206/621,
    623, 626

[56] References Cited

U.S. PATENT DOCUMENTS 3,219,084  11/1965  Ausnit et al. ............... 93/35 R X
4,058,953  11/1977  Sanborn et al. ............. 53/433

Primary Examiner—Travis S. McGehee
Attorney, Agent, or Firm—John J. Toney; William D. Lee, Jr.

[57] ABSTRACT

A method and apparatus for making a reclosable package from a forming web, a covering web and a closure strip. The closure strip is indented at desired intervals and sealed at its lower surface to the forming web. A cavity is formed in the forming web after which a product is placed therein and covered with the covering web. After evacuating the space therebetween the covering and forming webs are sealed together with longitudinal and transverse seals which enclose the product and the closure strip. The upper surface of the closure strip is sealed to the covering web so that when the package is severed between the closure strip and an adjacent longitudinal seal, the closure strip may be opened for access to the product.

12 Claims, 10 Drawing Figures

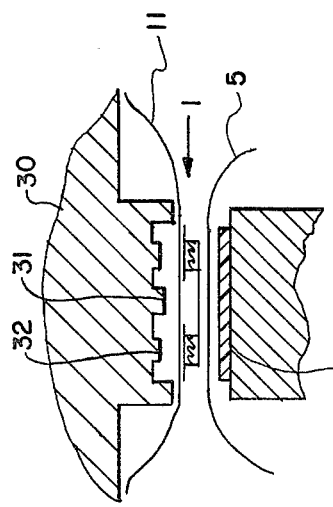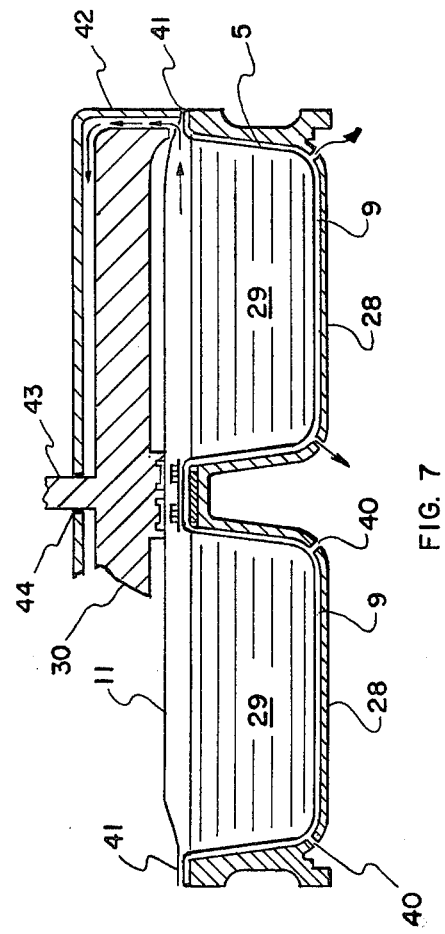

METHOD AND APPARATUS FOR MAKING A RECLOSABLE PACKAGE

FIELD OF INVENTION

This invention relates to a method and apparatus for making a reclosable package. Specifically, this invention relates to reclosable packages for food products such as cured or sliced processed meats and cheeses where the package is evacuated and/or gas flushed and hermetically sealed.

BACKGROUND

A substantial volume of the cheese, bacon, frankfurters, sliced luncheon meat and other processed meats are sold in packages which are formed from flexible thermoplastic materials. The freshness of the product within the package is to a large measure dependent upon the fact that the thermoplastic package is hermetically sealed and has been evacuated and, in some instances, gas flushed. However, in many instances, when an evacuated package of this type is purchased not all of its contents are used at once by the consumer. When the initial seal has been broken and part of the product removed it is difficult to reclose the package for satisfactory storage in a refrigerator; and, in order to preserve the contents in a fresh state without loss of flavor and texture, it is often necessary to completely repackage the product. To overcome this problem, there are many prior art package designs which offer means of opening and resealing but many of these have the disadvantage that wordy printed directions are needed and many times the thermoplastic packaging material is so stiff and so strong that even a carefully designed reclosure device can be destroyed. Thus, it is one object of the present invention to provide a strong, reliable means of resealing and closing a thermoplastic package which has been previously vacuum sealed.

Another object of the present invention is to provide a method and machine or apparatus for packaging a product in a reclosable package in a straight through process on a single machine rather than making a reclosable pouch on one machine and then performing the filling, evacuating, and sealing process on another machine.

Another problem which is encountered in prior art reclosable packages is the problem of manufacturing them at a commercially acceptable rate. Placing tear tabs, tear strips, or the like in combination with resealing means such as pressure sensitive adhesive strips calls for extreme care in registration and alignment of each of the packaging components and rather precise sealing must take place in order to achieve a satisfactory product. Accordingly, another of the objects of the present invention is to provide a method and apparatus for rapidly and reliably making a reclosable package.

The above objects and advantages of the present invention will be readily apparent to those skilled in the art from the description and drawings which follow below.

DISCLOSURE STATEMENT

Below are described patents which are believed to be pertinent to the present disclosure.

U.S. Pat. No. 3,219,084 issued on Nov. 23, 1965 to Steven Ausnit et al and describes a method of making pouches with reclosable closure strips by forming a pair of pouches which are initially interconnected at the top through a double joined fastener which is subsequently severed to make two separate bags.

U.S. Pat. No. 3,226,787 which issued to Steven Ausnit on Jan. 4, 1966 describes an improved flexible closure structure for pouches and bags wherein the closure structure is formed as a flexible integral sheet or as a pair of sheets by being extruded from a single pair of die openings shaped to form the elongated sheet with integral laterally spaced linearly extending interlocking portions on the sheet. The interlocking fastener elements are facing each other so that they may be mated or joined by the being pressed together without altering position.

U.S. Pat. No. 3,380,481 issued on Apr. 30, 1968 to O. K. Kraus and describes an elongated flexible closed one-piece tube having integrally formed longitudinally continuous interlocking elements formed thereon for slitting, cutting, and sealing to form closable and reusable pouches or bags therefrom.

U.S. Pat. No. 3,473,589 issued on Oct. 21, 1969 to Waldrop O. Gotz and describes a closure material having flexible pressure interlocking releasable fasteners or interlocking elements extending therealong for forming bags or similar articles for containing items such as perishable goods.

U.S. Pat. No. 3,780,787 which issued on Dec. 25, 1973 to Tatsuro Uramoto discloses a bag structure having strips with interlocking rib and groove profiles fused to the inside of the bag mouth to close the bag and adjacent reinforcing strips are provided for tear guidelines for tearing off the top of the bag.

U.S. Pat. No. 3,784,432 which issued on Jan. 8, 1974 to Takashi Noguchi describes a means and method of attaching a fastener profile to a plastic sheet.

U.S. Pat. No. 3,787,269 which issued on Jan. 22, 1974 to Takashi Noguchi describes a means and method for attaching interlocking strips to laminated sheets of plastic.

U.S. Pat. No. 3,827,472 which issued on Aug. 6, 1974 to Tatsuro Uramoto describes a flexible bag structure with interior interlocking rib and groove profiles to close the top of the bag with adjacent tear strip means to tear off the top of the bag.

U.S. Pat. No. 3,853,671 which issued on Dec. 10, 1974 to Steven Ausnit describes a mechanism and method for making material for multiple plastic bags with reclosable fasteners thereon.

U.S. Pat. No. Re 28,969 which was reissued on Sept. 21, 1979 to Kakuji Naito shows a reclosable plastic bag having interlocking rib and groove elements integral with the plastic of the bag with the elements being designed so that the bag opens easily from the outside but resists opening from the inside.

U.S. Pat. No. 4,058,953 which issued on Nov. 22, 1977 to Philip A. Sanborn, Jr. describes a packaging machine for forming, evacuating, and sealing thermoplastic packages.

SUMMARY OF THE INVENTION

In one aspect, the subject invention is a method of making a reclosable package comprising the steps of sealing one side of a closure strip to a first thermoplastic sheet, enclosing a product between said first and a second thermoplastic sheet with the closure strip inside the enclosure, and sealing another side of said closure strip to said second sheet while the product and strip are so enclosed. The product and strip are preferably enclosed within a peripheral seal with the ends of the closure strip terminating in or adjacent to the peripheral seal.

In another aspect, the subject invention is a method for making a reclosable package comprising the steps of: providing a formable web, a covering web, and a closure strip; indenting a portion of said closure strip at intervals spaced apart by approximately the desired length of the package; advancing the forming web and closure strip towards each other; sealing the lower surface of the closure strip to the forming web longitudinally in the direction of travel of the forming web; forming a cavity with a peripheral flange in the forming web so that said closure strip remains on a portion of said peripheral flange; placing a product in said cavity; covering said product with said covering web; evacuating the space between said web; sealing the webs together with longitudinal and transverse seals, one longitudinal seal being adjacent and parallel to but the spaced apart from the closure strip with the closure strip within the periphery of the seal, and the transverse seals being made across the closure strip where a portion of strip had been indented; and, sealing the upper surface of the closure strip to the covering web.

In still another aspect, the subject invention is an apparatus for making reclosable packages comprising: separate means for holding a supply of and for advancing a forming web, a covering web, and closure strip each towards the other; means for removing a portion of said closure strip; means for sealing the lower surface of said closure strip to said forming web; means for forming a product receiving cavity in said forming web so that the forming web retains a peripheral flange; means for covering the cavity in the forming web with the covering webs; means for evacuating the space between the forming and covering webs; means for sealing the covering and forming webs together with longitudinal and transverse peripheral seals enclosing a product and a closure strip, the closure strip being positioned so that the transverse seal is made across the space where a portion of the strip has been removed; and, means integral with the longitudinal sealing means to seal the upper surface of the closure strip of the covering web whereby when the package is severed between the closure strip and the adjacent longitudinal seal, the closure strip may be opened for access to the product.

DESCRIPTION OF THE DRAWINGS

In the drawings which are attached hereto and made a part of this disclosure:

FIG. 6 is a cross-sectional representation of the seal bars which seal the longitudinal center seal between the covering and forming webs and the seal bar which seals the closure strip to the upper web;

FIG. 7 is a cross-sectional representation of an evacuation and sealing station showing the position of the seal bars of FIG. 6 with respect to the filled forming web cavities of the package of the present invention;

DETAILED DESCRIPTION

Figure 1:
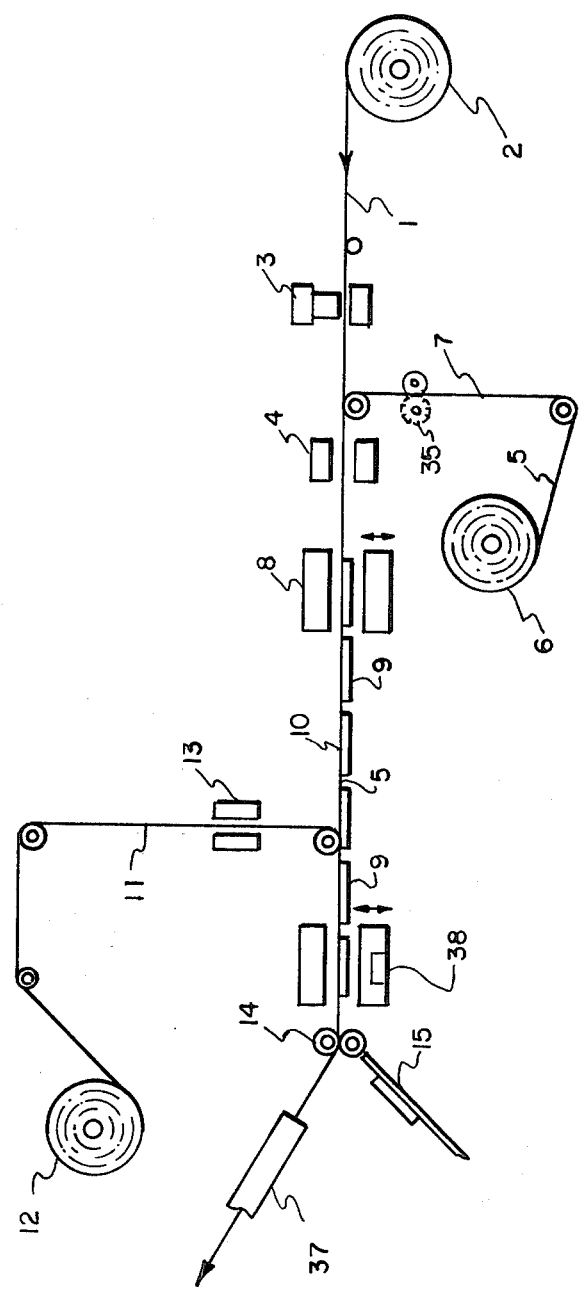
FIG. 1 is a schematic representation of the apparatus which performs the process according to the present invention.
Figure 2:
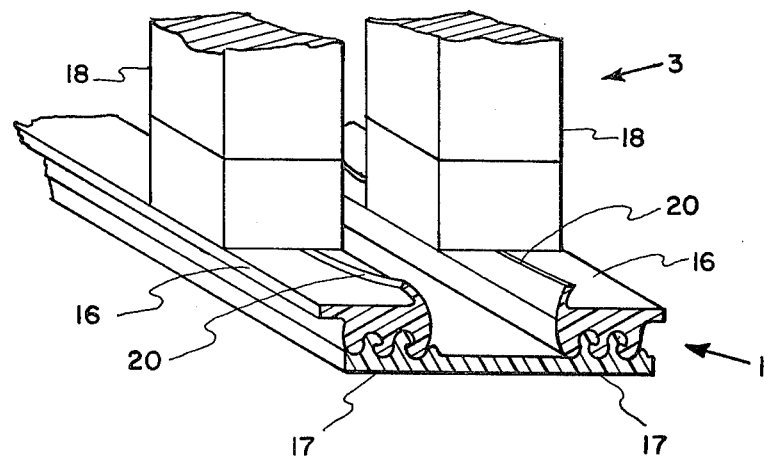
FIG. 2 is perspective representation of the means for forming an indentation in a closure strip according to the present invention.

Referring principally to FIG. 1, the apparatus and process of the subject invention will be described as well as the package which the process and apparatus produce. The closure strip 1 which provides the reclosable feature of the package of the present invention is supplied from supply roll 2 and is advanced or fed to the closure die punch assembly 3. This assembly and the punching performed at this station can be better appreciated by viewing FIGS. 2, 3, and 4 where punches 18 are shown in position to punch out the indentation 19 in the closure strip 1. In FIG. 2 the punching operation has just begun and in FIG. 3 the punching step has been completed and the result of the punching or strip removal can be better appreciated by reference to the top plan view in FIG. 4 of the closure strip.

The closure strip as shown is a double strip which supplies the closure element or strip 1 for two or more packages. The strip 1 comprises the male or rib portion 17 which interlocks into the female or grooved portion 16. As shown, there are two interlocking ribs which extend longitudinally on the rib portion 17 which snap fit into the corresponding longitudinal grooves on the groove or female portion 16. The present invention is not limited to any particular number of interlocking ribs and grooves as satisfactory closure strips can be made with one rib and one groove or with a plurality of ribs and grooves. The main criteria are that the rib and groove portions of the closure strip be readily separable by the fingers of the consumer who has purchased the package and that they be readily reclosable.

Figure 3:
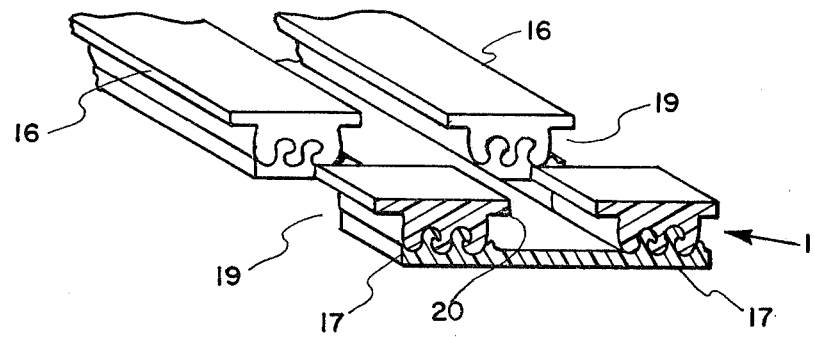
FIG. 3 shows the closure strip after an indentation has been made therein.
Figure 4:
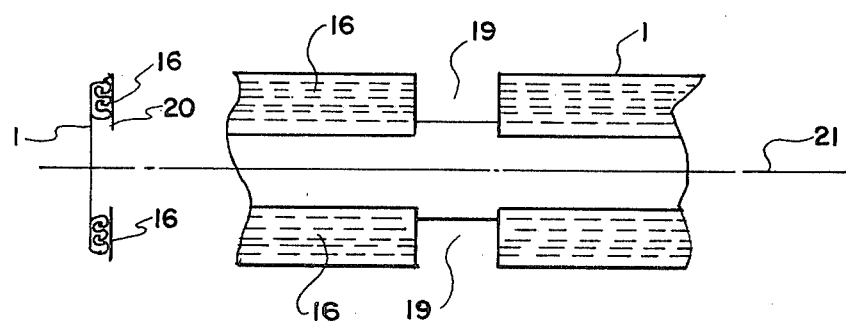
FIG. 4 shows a top plan view and a side view of the closure strip with the indentation been made in the strip according to the invention.

Still referring to FIGS. 2, 3, and 4 it should be noted that the groove portion or element 16 of the closure strip has a flange which is integral with the top surface of the closure strip and this provides for additional seal surface area between the groove 16 and the covering web or upper thermoplastic film. The flange which connects the ribbed portions 17 of the closure strip also provides a larger seal surface for sealing to the forming web or lower thermoplastic film in addition to connecting the two segments of the closure strip. It should be understood, of course, that the present invention could be practiced without having two connected closure strips but for ease in production and assembly it is economical to use the two side-by-side connected closure strips so that two or more packages can be made at the same time. Furthermore, there is no necessity for the rib portion to be on the lower closure strip segment or on the upper segment as the closure strip will function properly either way.

As shown in FIG. 2 the flange portion of the upper segment of the closure strip 1 has been folded over by a folding shoe which is not shown so that the punches 18 can punch out the entire upper flange and entire interlocking elements in one stroke and still leave enough material in the lower flange so that the strip will not be too weakened and break as it is advanced toward the forming web. The purpose for making the indentation or punch out in the closure strip is so that a smooth, fast, and secure peripheral seal can be made for the package as will be more fully described hereinafter.

Returning now to FIG. 1, the closure strip is advanced from the die punch assembly 3 to the closure strip seal station 4 where it meets the first thermoplastic sheet or forming web 5 which is fed and advanced from supply roll 6 through registration station 7 past a pair of perforating scoring wheels 35 and over a roller to meet the closure strip 1 at the closure strip seal station 4. Both the closure strip 1 and the forming web 5 are made from thermoplastic materials with the closure strip preferably being made from polyethylene or an ionomer and the forming web being thermoformable and preferably being a laminate of nylon and polyethylene which laminate in some instances will have multiple layers of these materials and, in addition may have a gas barrier layer or layers from material such as saran or hydrolyzed ethylene-vinyl acetate copolymer. The closure strip 1 is heat sealed to the forming web at the seal station and the sealing means can be either a plate and roller whereby the roller presses the strip against the heated plate as the closure strip 1 and forming web 5 pass thereover or a heated roller can press the strip or sheet against a backing surface. Another and preferred means of sealing is to use the combination of a heated plate and backing plate and when the motion of the sealing strip and forming web is stopped the web and strip are pressed together between said plates whereby the seal is completed during the stop. Both continuous sealing and intermittent between two thermoplastic surfaces is well known and within the skill of the art.

Figure 9:
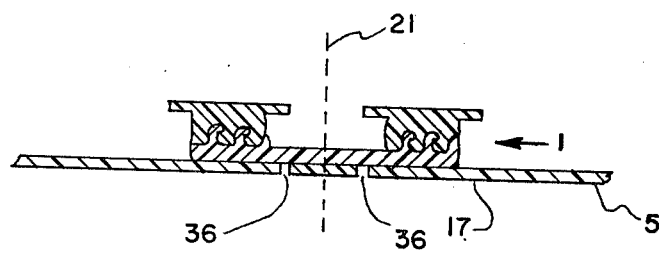
FIG. 9 is a cross sectional representation of a closure strip showing the strip sealing perforations or scores in the covering web; and, FIG. 10 is a perspective view of a package according to the present invention.

The closure strip is sealed over the score line or perforations 36 in the forming web 5 as shown in cross-section in FIG. 9. The score lines or perforations 36 were placed in the film web 5 by the scoring or perforating wheels 35 whose position is shown in FIG. 1. This pair of wheels (only one is visible in FIG. 1) simply punch out two lines of small holes in the forming web as the web passes between them and the backing roller, one line of perforations being made for each package. Instead of perforating wheels which punch holes in the web, scoring wheels may be used which "score" or press or cut a score line which cuts into the surface of the web but does not cut completely through the web. This score line may be continuous or intermittent.

Referring again to FIG. 1, after the closure strip has been sealed to the forming web at station 4 the forming web moves to forming station 8 where cavities or pockets are formed in the forming web. The forming web is first clamped around the periphery of the forming die cavity, heated to its forming temperature and drawn by pressure differential into the die cavity where it is formed and cooled. In FIG. 7 the cross-section of the evacuation and sealing station 38 is shown and the pocket 28 closely resembles a forming cavity at forming station 8. The pressure differential is applied through the ports 40 to draw the forming web into the cavity for thermoforming. In FIG. 7 the position of the closure strip 1 at the sealing station is also shown. At this point the formed pockets 9 have been made and the closure strip 1 is securely sealed to the forming web in the area between the pair of pockets 9 as can be seen in FIG. 9.

After leaving the forming station 8 as shown in FIG. 1, the pockets are moved to loading station 10 where the product is placed in the pockets. Almost any type of product can be packaged but specifically the present invention is intended for food products such as sliced meat products including bacon and sliced breakfast meats, luncheon meats, cheeses and the like.

After the product has been loaded into the pockets, the loaded pocket is then advanced to meet the second thermoplastic sheet or covering web 11 which is fed from covering web supply roll 12 and passes through a web registration station 13 on its way to be laid over the pockets to enclose the product and closure strip between the first and second thermoplastic sheets. The covering web is also a thermoplastic sheet, preferably a nylon or polyester/polyethylene laminate, but of lighter gauge than the forming web so that it is not generally considered to be a formable film because it will not readily extend. The covering web also may include a layer of gas barrier material such as saran or hydrolyzed ethylene vinyl acetate copolymer and may be printed with the label of the particular packer. The polyethylene or ethylene vinyl acetate copolymer layers generally serve as sealing layers and sometimes an ionomer may be used for these layers.

Figure 8:
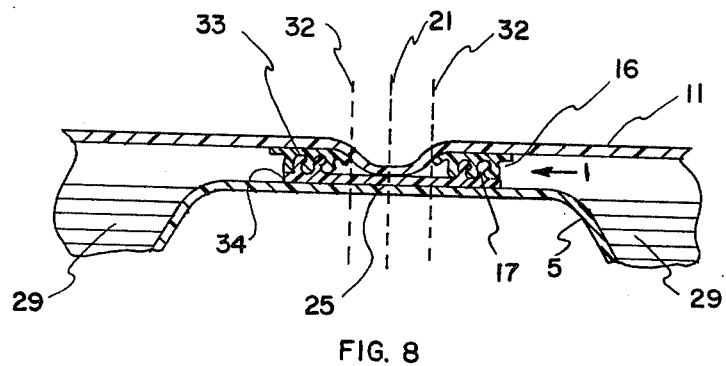
FIG. 8 is a cross-sectional representation of a portion of the package of the present invention showing the arrangement of the seals or enclosure strips prior to packages being severed one from the other.

When laid over the pockets filled with product 29, the covering web 11 covers the pockets as shown in FIG. 7. This assembly as shown in FIG. 7 in cross-section is the sealing and gas flushing and evacuation station 38 where the final package seals are to be made. The peripheral seals are made along the area 41 and the center seal is made between the pockets. While in the station 38 the webs are clamped together between outer wall 42 and pocket 28 generally in the area 41. The space between the two webs 5 and 11 which contains the product in the cavity 9 may be evacuated in any one of many different ways and the present invention is not to be limited to any particular method of evacuating the package as many are available in the prior art. Actually, the evacuation or gas flushing station 38 is really a vacuum chamber and in some methods the webs may be kept separated by either applying a vacuum above covering web 11 at the same time that vacuum is applied through ports 40 to the forming web to separate the two webs so that they may be evacuated through the separation. In other designs the peripheral area 41 may be completely sealed and then the upper web 11 is drawn against a vacuum port containing a knife to slit the upper film 11 so that the package may be evacuated through the slit before the slit is resealed. In the preferred design as shown, the upper web 11 is pre-slit to serve as an evacuation port (see arrows indicating flow of air) and this pre-slit web is then finally sealed by a seal bar 30 when the center seal is made. In any event, after the evacuation of the package is completed and gas filled, if desired, the final sealing takes place and is shown in greater detail in FIG. 6 where resilient seal member 39 serves as the backing pad for the seal bar 30. At this point the lower or forming web 5 has already been sealed to closure strip 1 and as the seal bar 30 is lowered the peripheral seal is made closing the evacuation slit (see FIG. 7) and the center seal bar face makes the main center seal between the packages as it is pressed downwardly while the closure strip seal bar face 32 seals the upper surface of the closure strip 1 to the upper or covering web 11. When this sealing step has been accomplished the cross section in an exploded fashion of the area shown in FIG. 6 can be seen better by looking at FIG. 8. The center seal 25 is shown where the upper web 11 is sealed to the flange between the closure elements and the closure elements on the closure strip are sealed to the lower web 5. Center line 21 notes the cut line between the packages and the line 32 is the line along which the package can be cut or if a score line or perforations are placed along this line (see FIG. 9) such as the perforations 36 then the package can be torn open along this line. This removes the outer hermetic seal and exposes the closure strip to manual opening by gripping each severed flange and pulling the closure strips apart. After they have been pulled apart they may be readily pressed together for resealing.

Figure 5:
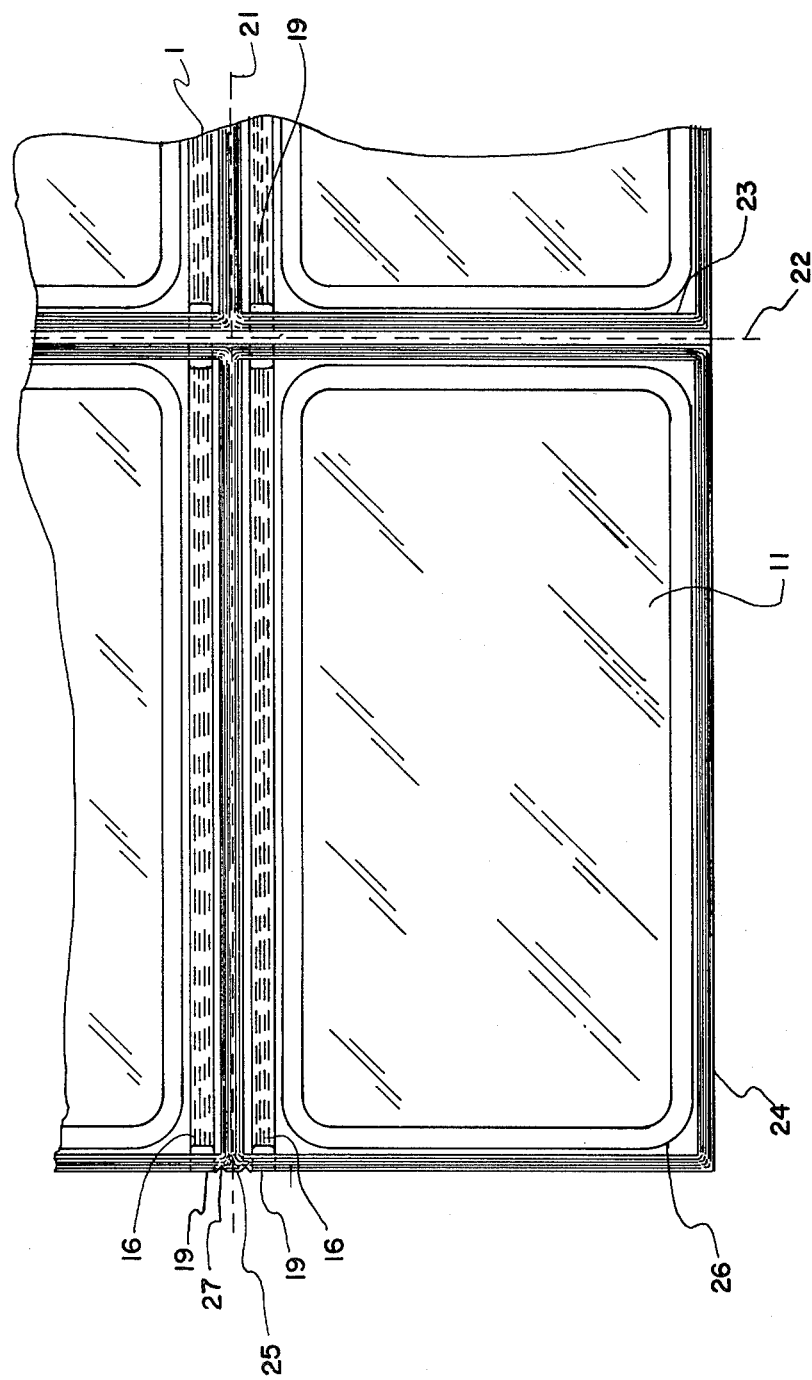
FIG. 5 is a top plan view of a package according to the present invention prior to its being severed from adjacent and trailing packages.

A top plan view of a package with one end having been trimmed by cutter 14 (see FIG. 1) so that vacuum 37 carries away the trimmed portions is shown in FIG. 5 and the longitudinal cut line 21 is shown as well as the transverse cut line 22 between package seals. A tear tab notch 27 may be provided in which the line of perforations terminates or a slit may be substituted for the notch. This provides the starting point for a tear line to tear along the perforations 36 which are not shown in FIG. 5 but which are shown in their proper positions in FIG. 9. The top of the closure elements 16 as shown in FIG. 5 and the peripheral seal 24 which is the longitudinal outside edge seal is also shown along with the transverse seal 23 between each package. The indentation 19 for each package seal is shown and as can be seen the indentation 19 provides for a smooth continuous transverse seal. If the indentation 19 were not provided then the continuous closure strip in this area would present a large mass of material which would have to be melted and pressed down at this point in order to ensure that complete sealing was achieved. To apply sufficient energy to melt this mass of material in a short period of time would require is impractical and to hold the seal bars in a dwell position that for a sufficient period of time in order to melt the seal would require a very slow process. By providing an indented closure strip these sealing problems are avoided.

As a practical matter it is more economical to continuously manufacture the sealing strip and then indent or punch out the unnecessary portions. However, in some instances it might be feasible to manufacture the indentations in the closure strip but, if this were done, it would limit such a closure strip to a certain length package whereas in the process of this invention the punch may be timed to punch at the exact pocket length. The pocket outline 26 shown in FIG. 5 can be varied in any machine by using appropriate dies.

Figure 10:
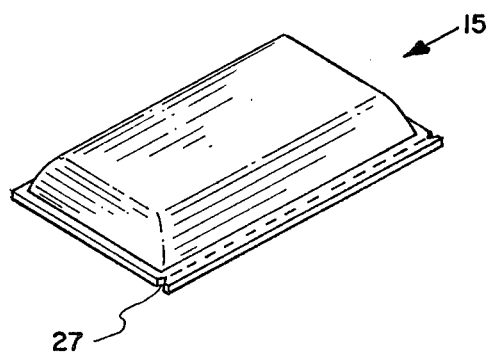

The finished package 15 has an appearance as shown in FIG. 10 and this package may be readily reopened and resealed.

Having thus described my invention I claim:

1. A method for making a reclosable package from thermoplastic materials comprising the steps of:
    (a) providing a formable web, a covering web, and a closure strip;
    (b) indenting a portion of said closure strip at intervals spaced apart by approximately the desired length of the package;
    (c) advancing the forming web and closure strip towards each other;
    (d) sealing the lower surface of the closure strip to the forming web longitudinally in the direction of travel of the forming web;
    (e) forming a cavity with a peripheral flange in said forming web so that said closure strip remains on a portion of said peripheral flange;
    (f) placing a product in said cavity;
    (g) covering said product with said covering web;
    (h) evacuating the space between said webs;
    (i) sealing the webs together with longitudinal and transverse seals, one longitudinal seal being adjacent and parallel to but spaced apart from the closure strip with the closure strip within the periphery of the seals, and the transverse seals being made across the closure strip where a portion of the strip had been indented; and
    (j) sealing the upper surface of the closure strip to the covering web.

2. The method of claim 1 wherein said closure strip is indented by punching out a portion of the strip.

3. The method of claim 1 wherein each of the sealing steps is accomplished by heat sealing.

4. The method of claim 1 wherein the cavity is formed by heating the formable web and drawing the heated web into a mold.

5. The method of claim 1 including between steps (c) and (d) the step of perforating said forming web in a series of perforations to form a tear line and in step (d) sealing the closure strip to the forming web so that at least a portion thereof seals said perforations.

6. The method of claim 1 including between steps (c) and (d) the step of scoring said forming web to form a tear line.

7. The method of claim 2 wherein the upper surface of said closure strip includes an integral flange member and including prior to step (b) the step of folding said flange member over the upper surface of said closure strip so that the flange member is also removed with the punching.

8. The method of claim 1 wherein the closure strip comprises two parallel fastener elements connected by a flange member integral with their bottom surfaces which surface is sealed to approximately the longitudinal center-line of the forming web in step (d) whereby steps (c) through (h) are performed side-by-side using the portions of the respective forming and covering webs on either side of said center-line.

9. An apparatus for making reclosable packages comprising:
    (a) separate means for holding a supply of and for advancing a forming web, covering web, and closure strip each toward the other;
    (b) means for removing a portion of said closure strip;
    (c) means for sealing the lower surface of said closure strip to said forming web;
    (d) means for forming a product-receiving cavity in said forming web so that the forming web retains a peripheral flange;
    (e) means for covering the cavity in the forming web with the covering webs;
    (f) means for evacuating the space between the forming and covering webs;
    (g) means for sealing the covering and forming webs together with longitudinal and transverse peripheral seals enclosing a product and the closure strip, the closure strip being positioned so that the transverse seal is made across the space where a portion of the strip has been removed; and,
    (h) means integral with the longitudinal sealing means to seal the upper surface of the closure strip to the covering web whereby when the package is severed between the closure strip and the adjacent longitudinal seal, the closure strip may be opened for access to the product.

10. The apparatus of claim 9 including means to perforate the forming web to form a tear line.

11. The apparatus of claim 9 wherein said means for removing a portion of said closure strip is a punch means.

12. The apparatus of claim 9 wherein the means for evacuating the space between said webs is a vacuum chamber.

* * * * *